No. 862,916. PATENTED AUG. 13, 1907.
G. HOOKHAM.
ELECTRICITY MOTOR METER.
APPLICATION FILED NOV. 6, 1906.

3 SHEETS—SHEET 1.

No. 862,916. PATENTED AUG. 13, 1907.
G. HOOKHAM.
ELECTRICITY MOTOR METER.
APPLICATION FILED NOV. 6, 1906.

3 SHEETS—SHEET 2.

Inventor
George Hookham.

No. 862,916. PATENTED AUG. 13, 1907.
G. HOOKHAM.
ELECTRICITY MOTOR METER.
APPLICATION FILED NOV. 6, 1906.
3 SHEETS—SHEET 3.
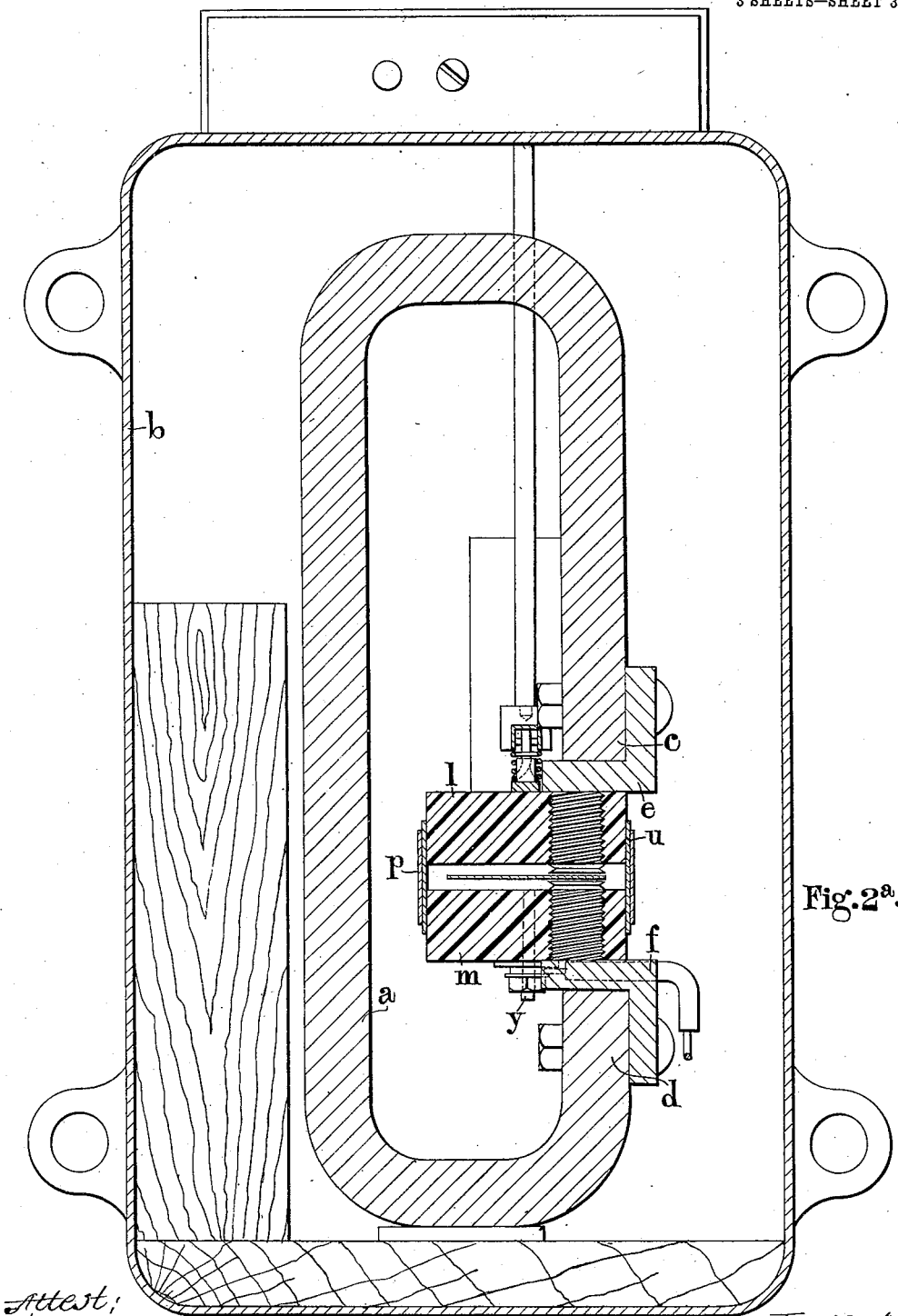
Fig. 2ª.
Attest:
Inventor
George Hookham.

UNITED STATES PATENT OFFICE.

GEORGE HOOKHAM, OF BIRMINGHAM, ENGLAND.

ELECTRICITY MOTOR-METER.

No. 862,916.  Specification of Letters Patent.  Patented Aug. 13, 1907.

Application filed November 6, 1906. Serial No. 342,275.

*To all whom it may concern:*

Be it known that I, GEORGE HOOKHAM, a subject of the King of Great Britain and Ireland, and residing at 4 New Bartholomew street, Birmingham, in the county of Warwick, England, manufacturer, have invented certain new and useful Improvements in Electricity Motor-Meters, of which the following is a specification.

My invention relates to electricity motor meters and to the class of motor meters known as Foucault brake meters in which a disk or cylinder is immersed in mercury and rotated between the poles of a magnet. Heretofore in order to produce a meter of this class having commercial accuracy, it has been necessary to add a correction for the error at high speeds due to the fluid friction of the mercury.

The object of the invention is to simplify the construction of mercury motor meters having Foucault brakes while the range and accuracy are at the same time improved.

My invention consists in the use in motor meters of a single powerful magnet having a single pair of poles one each side of the armature disk, said poles being provided with means for reducing fluid friction and for preventing the passage of current through the metal of the poles, whereby it is made practicable to bring the pole tips extremely close to the surfaces of the disk.

The invention consists more specifically in providing a thin metallic plate or cap for each pole tip electrically insulated therefrom and in amalgamating this plate or cap so that the pole tip can be brought very close to the revolving disk without interfering with the flow of mercury under the poles while any substantial diversion of the current from its path through the armature disk is prevented.

The invention also consists in the construction of the motor meter hereinafter described.

By means of my invention I obtain a very strong brake and am enabled to reduce the maximum speed of the disk from 60 to 100 to about 20 to 25 revolutions per minute, so that with a meter of ordinary range I am able to dispense with a correcting magnet, obtaining in a five ampere meter, for example, commercial accuracy from about 0.2 amperes to 5 amperes. If it is desired to obtain a meter of extraordinary range I may add a correcting magnet, and run the meter up to correspondingly higher maximum speeds.

Figure 1:
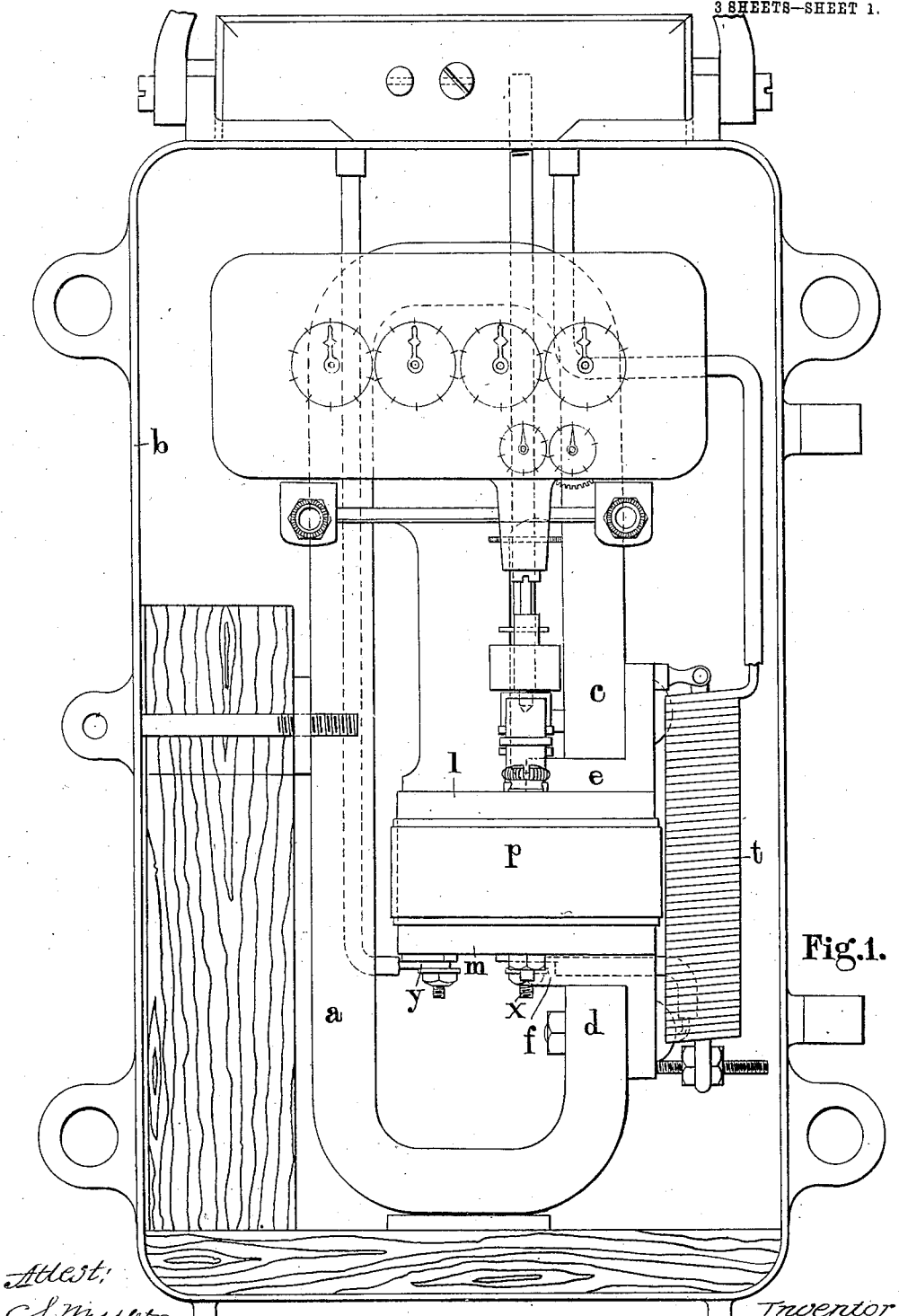
Figure 3:
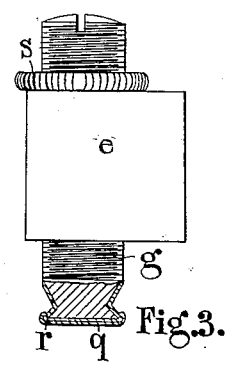
Figure 4:
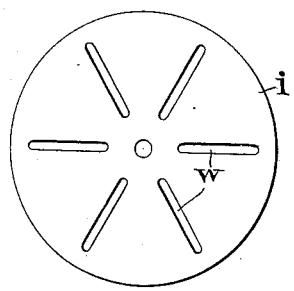
Figure 2:
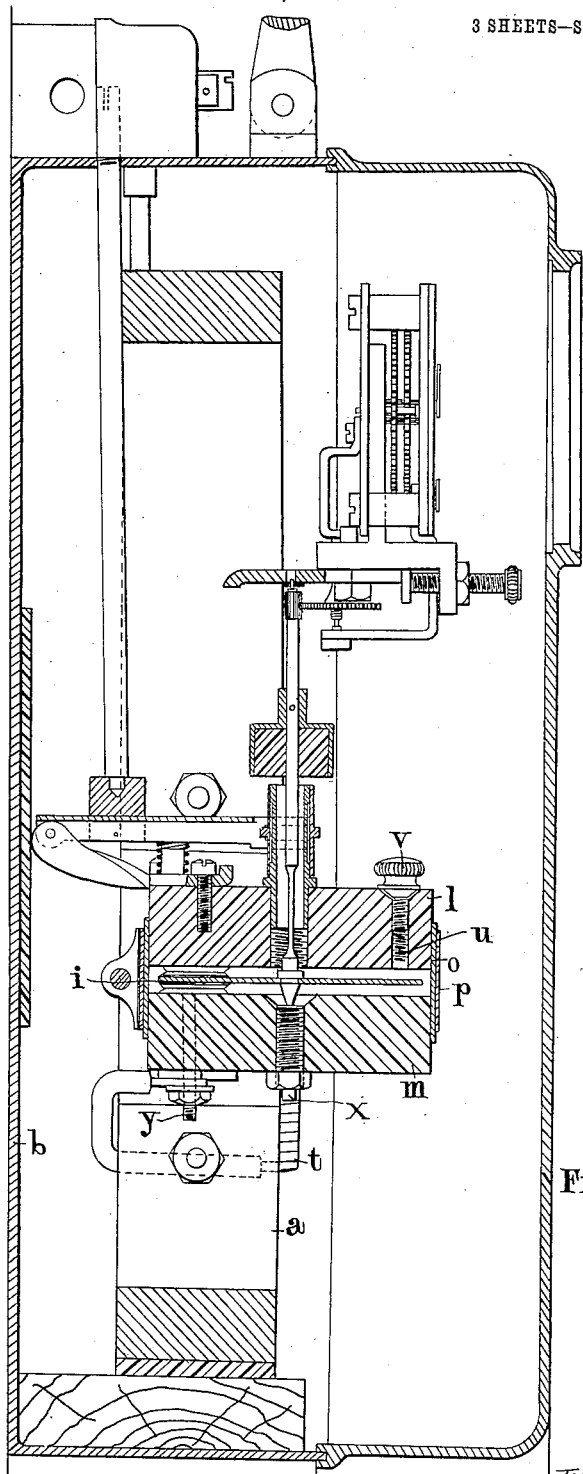

Referring to the accompanying drawings, Figure 1 is a front elevation of a meter constructed according to my invention, the cover being removed; Fig. 2 is a vertical section perpendicular to the central plane of the magnet; and Fig. 2$^a$ a vertical section in the central plane of the magnet, while Fig. 3 is an enlarged section of a modified form of pole piece. Fig. 4 is a plan view of one form of armature.

In the meter illustrated in Figs. 1, 2, and 2$^a$ I provide a C-shaped magnet, $a$, bent so as to give the greatest possible average distance between the back of the magnet and the cast iron case, $b$, to which it is attached and also between its own parts and I leave a gap between its poles, $c, d$, of about two inches. The surfaces of these poles are ground true on the end and outside for about an inch, and to these true surfaces are attached iron pole pieces, $e, f$, at least one inch deep with projections whose ends are turned true and flat to form the pole tips between which the disk armatuer rotates.

In the arrangement shown in Fig. 3, a modified arrangement of the pole tips is shown, the pole tips being formed at the ends of the screw pieces, $g$, of wrought iron; and in order to give greater braking force the section of the pole tip is reduced just above the end leaving the edge of the pole sharp and forming less than a right angle with the stem. The form of the poles, $c, d$, shown in Figs. 1 and 2, would be suitably modified when this form of pole piece is used.

The pole tips, $e, f$, as illustrated in Figs. 1 and 2 and 2$^a$ pass through and are preferably screwed into circular blocks or disks, $l, m$, of ebonite, the inner surfaces of these blocks forming the upper and lower surfaces of the mercury chamber in which the disk armature, $i$, rotates. The encircling wall of the mercury chamber is formed by a band, $o$, of india rubber, leather, or like pliable material round which is clamped a band of metal, $p$, this construction allowing the working parts of the meter to be seen in their final positions before the circular wall is fixed, and the mercury chamber completed an aperture, $u$, adapted to be closed by a screw, $v$, is provided in the upper wall of the chamber and is used for running in mercury when the chamber has been closed.

In order to make it possible to work with very small clearances between the disk armature and the pole tips I allow the latter to project beyond the general surfaces of the mercury vessel but as poles so projecting are very liable to cause a bubble of air to be inclosed I fit at the ends of the pole tips thin caps of iron, $q$, separated from the pole tips by insulating material, $r$, and amalgamate the exposed surfaces of these caps. This I preferably do by first depositing copper on the thin iron plate. I find that amalgamating the exposed surface as above described has the effect of reducing fluid friction and prevents the formation of air bubbles. The amalgamated metal is insulated from the main body of the pole piece, in order to avoid the passage of any considerable current through the ends of the pole tips across the mercury bath. Although the thin metal is shown in the form of a cap, it may be a simple disk, the pole piece being suitably insulated. In the modification shown in Fig. 3 the clearance between the disk and the pole tips can be varied by turning the screwed pole pieces which are held in any fixed position by the screwed washer, s, thus providing a convenient means for standardizing the meter the current passes from the contact, x, through the spindle of the disk armature radially through the disk and out of the mercury chamber by the contact, y, extending into the mercury.

If a great range or greater accuracy through the same range is required I may provide a correcting coil, t, placed in series with the current to be measured and wound on a piece of iron partly bridging the pole pieces or projecting from one of the pole pieces but in all cases such iron pieces are so placed or so proportioned that they do not appreciably affect the field in which the armature rotates, when no current is passing, and the correction acts not by weakening the magnets but by diverting lines of force from the field in which the armature rotates.

To remove air bubbles from the mercury chamber I may form radial slits w in the armature as shown in Fig. 4. These slits are equal in length to the diameter of the pole-piece, and should be amalgamated at their edges.

Having now described my invention, what I claim as new and desire to secure by Letters Patent is:—

1. In an electricity meter in combination, a mercury chamber, mercury in said chamber, an armature in said chamber, a magnet, pole pieces on said magnet, said pole pieces projecting into said chamber, means for reducing fluid friction between the mercury and the pole pieces on said magnet, and means for preventing the passage of current through the magnet; as set forth.

2. In an electricity meter, in combination a magnet, pole pieces on said magnet, insulating means on said pole pieces, amalgamated elements connected with said means, as set forth.

3. In an electricity meter in combination, a mercury chamber, mercury in said chamber, an armature in said chamber, a magnet, pole pieces on said magnet, said pole pieces projecting into said chamber, amalgamated plates or caps on said pole pieces, and means for preventing the passage of current through the magnet; as set forth.

4. In an electricity meter, in combination a magnet, pole pieces on said magnet, insulating means on said pole pieces, iron caps on said insulating means, and a deposit of amalgamated copper on said caps, as set forth.

5. In an electricity meter having a mercury chamber fixed upper and lower walls for said chamber, flexible material closing said chamber and means clamping said flexible material laterally against the sides of said fixed upper and lower walls, as set forth.

6. In an electricity meter having a mercury chamber fixed upper and lower walls for said chamber, a band of flexible material forming the side wall of said chamber and means removably clamping said band laterally against said fixed upper and lower walls, as set forth.

In testimony whereof, I affix my signature in presence of two witnesses.

GEORGE HOOKHAM.

Witnesses:
 ERNEST PARKER,
 KATHLEEN M. THOMPSON.